United States Patent
Tanaka

(10) Patent No.: US 6,470,265 B1
(45) Date of Patent: *Oct. 22, 2002

(54) METHOD AND APPARATUS FOR PROCESSING DIGITAL MAP DATA

(75) Inventor: Isahiko Tanaka, Susono (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/582,028

(22) PCT Filed: Dec. 16, 1998

(86) PCT No.: PCT/JP98/05679

§ 371 (c)(1),
(2), (4) Date: Jun. 21, 2000

(87) PCT Pub. No.: WO99/34346

PCT Pub. Date: Jul. 8, 1999

(30) Foreign Application Priority Data

Dec. 25, 1997 (JP) .............................................. 9-357611

(51) Int. Cl.[7] .................................................. G06F 7/00
(52) U.S. Cl. ...................................... 701/208; 701/223
(58) Field of Search .................................. 701/200, 208, 701/209, 223; 340/988, 990, 995; 382/103

(56) References Cited

U.S. PATENT DOCUMENTS 5,359,526 A * 10/1994 Whittington et al.
6,199,000 B1 * 3/2001 Keller et al.
6,243,483 B1 * 6/2001 Petron et al.
6,247,019 B1 * 6/2001 Davies

FOREIGN PATENT DOCUMENTS

| JP | 52-41033 | 3/1977 |
|---|---|---|
| JP | 5-165402 | 7/1993 |
| JP | 5-181411 | 7/1993 |
| JP | 7-28400 | 1/1995 |
| JP | 7-28980 | 1/1995 |
| JP | 7-92906 | 4/1995 |
| JP | 8-30194 | 2/1996 |
| JP | 8-335298 | 12/1996 |
| JP | 9-5433 | 1/1997 |
| JP | 9-101742 | 4/1997 |
| JP | 9-102034 | 4/1997 |
| JP | 9-114367 | 5/1997 |
| JP | 9-160482 | 6/1997 |

* cited by examiner

Primary Examiner—William A. Cuchlinski, Jr.
Assistant Examiner—Edward Pipala
(74) Attorney, Agent, or Firm—Pillsbury Winthrop LLP

(57) ABSTRACT

In a digital map data processing device and a digital map data processing method which are useful to generate an accurate road map and particularly can be used for navigation and control of traveling vehicles according to the generated road map, a map image processing station 16 acquires image data of the ground surface through a satellite communication station 14, and an image processing section 20 converts the image data into orthoimage data which is viewed substantially from directly above and free from distortion. A data extraction section 22 extracts a skeleton map (road network data) formed of roads and related stereoscopic information according to the orthoimage data, a data conversion section 24 calculates base road data from the skeleton map, and a map generation section 28 overlays necessary attribute data to generate highly accurate digital orthomap data free from a distortion. The digital orthomap data is sent to a vehicle 18 through a transmission section 30 and used for navigation control and running control.

11 Claims, 10 Drawing Sheets

METHOD AND APPARATUS FOR PROCESSING DIGITAL MAP DATA

TECHNICAL FIELD

The present invention relates to a digital map data processor and a digital map data processing method, and more particularly to a processor and processing method for digital map data generated from ground surface photographic data.

BACKGROUND ART

Navigation systems, which by use of Global Positioning System (GPS) satellite signals are able indicate the position of the vehicle on which they are installed and to provide a route for guidance to a destination are recently becoming increasingly common. There has also been proposed a dynamic route guidance system (DRGS) which uses a VICS (Vehicle Information Communication System) to obtain traffic information such as link traveling time from an information center, retrieves a traveling route recommended for reaching a destination in the shortest time according to the obtained traffic information, and provides this route to the user (driver or the like). A user of such a system recognizes the traveling route and various information provided by the system as shown on a display or guided by voice. With the route guiding information, the user is able to operate the vehicle to drive more comfortably and without tiring so much.

A navigation function used by the aforesaid system may comprise a dead-reckoning navigation, map matching, GPS, and the like. In dead-reckoning navigation, a running track of a vehicle is determined from a relative position of a vehicle as determined using direction and distance sensors mounted on the vehicle. In map matching, the running track of the vehicle is determined by dead-reckoning navigation with the road form on the map data to judge the traveled road, thereby determining a position of the vehicle on a map. The position accuracy of map matching can be improved by joining with an absolute position (latitude and longitude) information of the vehicle obtained by the GPS.

For the user to recognize the information provided by the aforesaid system without feeling a sense of incongruity, the actual state around the vehicle (road forms and surrounding buildings) should agree with the displayed contents which are displayed together with the pertinent vehicle on the display device or the like. Therefore, a map accurately indicating the position of the pertinent vehicle is required.

It is desirable to use map data which is corrected by performing actual measurement, building investigation, and the like, but problems related to the enormous map making time and cost, very long update intervals(e.g., every year), and less than optimum timing remain obstacles.

Japanese Patent Application Laid-Open Publication No. Hei 7-28400 discloses a technology wherein satellite image data captured by an earth observation satellite is transmitted to vehicles and the like on the ground, the satellite image is converted into a map background image, and the background image is combined with previously generated place name data and road data to generate the map. According to this technology, satellite image data of the ground surface photographed at a relatively short cycle can be obtained, so that the map can be updated relatively frequently. The position of the vehicle is displayed on the background image which is an actual photo image and the user can readily see the buildings and surrounding environments (a surrounding image of the vehicle) on the map. Thus, the degree of recognition of information is improved.

With the above method, however, the obtained photo of the ground surface is only an image and does not include data related to place names and the like linked to roads and a distance of each link of the roads to calculate the route. Therefore, there is a disadvantage that conventional navigation functions for sophisticated route calculation (e.g., toll road priority retrieval, cost priority retrieval, etc.), route guidance (avoidance of a traffic jam, avoidance of traffic restriction, etc.), warning control (warning of a curve, warning of an uphill or downhill slope, etc.), and the like cannot be made. Also, because photographs are taken from different photographing angles with photographing timing, the photographed road forms and the like differ from actual ones. As a result, when the previously generated road data, place name data and the like are overlaid, the places shown on the photo are displaced from the places (latitude and longitude) of the each data.

Therefore, there is a problem that when various types of information are composed, total map accuracy is degraded, and the calculation by the aforesaid navigation function cannot be conducted accurately. There is also a disadvantage that the position shown on the photo is displaced from the position of the pertinent vehicle recognized by the GPS, and the navigation itself becomes meaningless.

The present invention was achieved to remedy the aforesaid problems and it is an object of the invention to provide a digital map data processing device and a digital map data processing method which can obtain accurate road map data by using data which can be obtained easily and frequently and use the obtained data effectively.

DISCLOSURE OF THE INVENTION

The present invention is directed to a digital map data processing device which comprises image data acquiring means which obtain image data of the ground surface captured from a high point of view; image processing means which convert the image data into orthoimage data viewed substantially from directly above; data extraction means which extract road network data of the ground surface on the basis of the orthoimage data; data conversion means which convert the road network data into a data format corresponding to a predetermined digital road map; and map generating means which generate digital orthomap data by overlaying the converted road network data on the predetermined digital road map.

The image data of the ground surface photographed from a high point of view may be image data captured by high-altitude aircraft such as an airplane or a satellite. Here, orthoimage data viewed substantially from directly above does not necessarily mean a complete vertical to the ground surface, but to the extent that the roads and buildings on the ground surface are viewed plane. Also, the road network data includes roads and three-dimensional information (e.g., terrain, facility appearance, etc.) related to the roads, and the data conversion means add altitude information and the like related to roads and a distance of each link and the link division to the roads of the extracted road network data. In addition, the map generating means overlay place name information, name information, road-related control information and the like on the network data to generate the road map. By configuring in this way, the road network data extracted from the image data in an orthogonally projected state and viewed substantially from directly above has roads in accurate forms corresponding to actual latitude and longitude, so that when various types of information are overlaid, the information is free from displacement, and a map of high accuracy can be generated. The road network is extracted on the basis of the orthoimage data having all the areas viewed from directly above. Therefore, accurate map data corresponding to the actual roads can be obtained.

In the aforesaid structure, the present invention may include a feature that the data extraction means include comparison means which compare first orthoimage data converted at a first time with second orthoimage data converted at a second time to obtain change portion data between them, and the map generating means correct the digital orthomap data according to the change portion data.

With the above configuration, map data may be corrected for only portions changed between the first time and the second time. Therefore, the map generating cost can be reduced, and the map data can be updated frequently.

In the aforesaid structure, the present invention may further comprise transfer means which transfer the generated digital orthomap data to an external map data processing system.

The external map data processing system may be a navigation system using the map data to perform various types of processing and various retrieval systems, which are used at any place such as a vehicle and an information center. The transfer means may also include storage means, such as CD-ROM and DVD, in addition to wired or wireless communication means to transfer. By configuring as described above, the highly accurate map data can be used with ease.

With the aforesaid structure, the present invention may have a feature that image data acquired by the image data acquiring means is satellite image data captured by an artificial satellite.

By configuring as above, the image data can be obtained frequently, and the latest road data can be obtained. Therefore, the map data can be updated easily and accurately with desired timing.

The present invention is also directed to a digital map data processing method, which comprises an image data acquiring step which obtains image data of the ground surface captured from a high point of view; an image processing step which converts the image data into orthoimage data viewed substantially from directly above; a data traction step which extracts road network data of the ground surface on the basis of the orthoimage data; a data conversion step which converts the road network data into a data format corresponding to a predetermined digital road map; and a map generating step which generates digital orthomap data by overlaying the converted road network data on the predetermined digital road map.

The present invention is also directed to a medium on which generation software for generating digital orthomap data is recorded, characterized in that the generation software is executed on a computer and includes: a module which processes to convert image data of the ground surface captured from a high point of view into the orthoimage data viewed substantially from directly above, a module which extracts road network data of the ground surface according to the orthoimage data, a data conversion module which converts the road network data into a data format corresponding to a predetermined digital road map, and a module which generates digital orthomap data by overlaying the converted road network data on the predetermined digital road map.

The present invention is also directed to a digital map data processing device, which comprises data acquiring means which obtain digital orthomap data generated according to image data of the ground surface photographed from a high point of view; writing means which write the acquired digital orthomap data into map storage means associated with a navigation system; and control means which control the navigation system according to the written digital orthomap data.

The data acquiring means may also include the reading of data from the wired or wireless communication means or from the storage means such as CD-ROM or DVD. By configuring as above, the map generated according to the road network data extracted from the image data, which is in the orthogonally projected state and viewed substantially from directly above, has the road forms corresponded to the actual latitude and longitude and the various types of information overlaid without being displaced. Thus, the map is very precise, and the navigation can be controlled very accurately.

In the aforesaid structure, the present invention may have a feature that the control means also control a vehicle-mounted running control device.

The running control equipment may include, for example, acceleration control, shift control, brake control, suspension control, drive wheels control and steering control equipment. The digital orthomap data may include altitude data in addition to the latitude and longitude so that a road inclination and a radius of curvature of a curve can be calculated accurately. For example, shift control and acceleration control for deceleration before a curve and an uphill or downhill inclination lane can be made with appropriate timing in an appropriate amount of control. Thus, vehicle control can adjust to terrain.

The present invention is also directed to a digital map data processing method, which comprises an acquiring step which obtains digital orthomap data generated according to image data of the ground surface photographed from a high point of view; a writing step which writes the acquired digital orthomap data into map storage means associated with a navigation system; and a control step which controls the navigation system according to the written digital orthomap data.

In the aforesaid structure, the present invention may have a feature that the control step also controls a vehicle-mounted running control device.

BEST MODE FOR CARRYING OUT THE INVENTION

A preferred embodiment of the present invention will be described with reference to the accompanying drawings.

Figure 1:
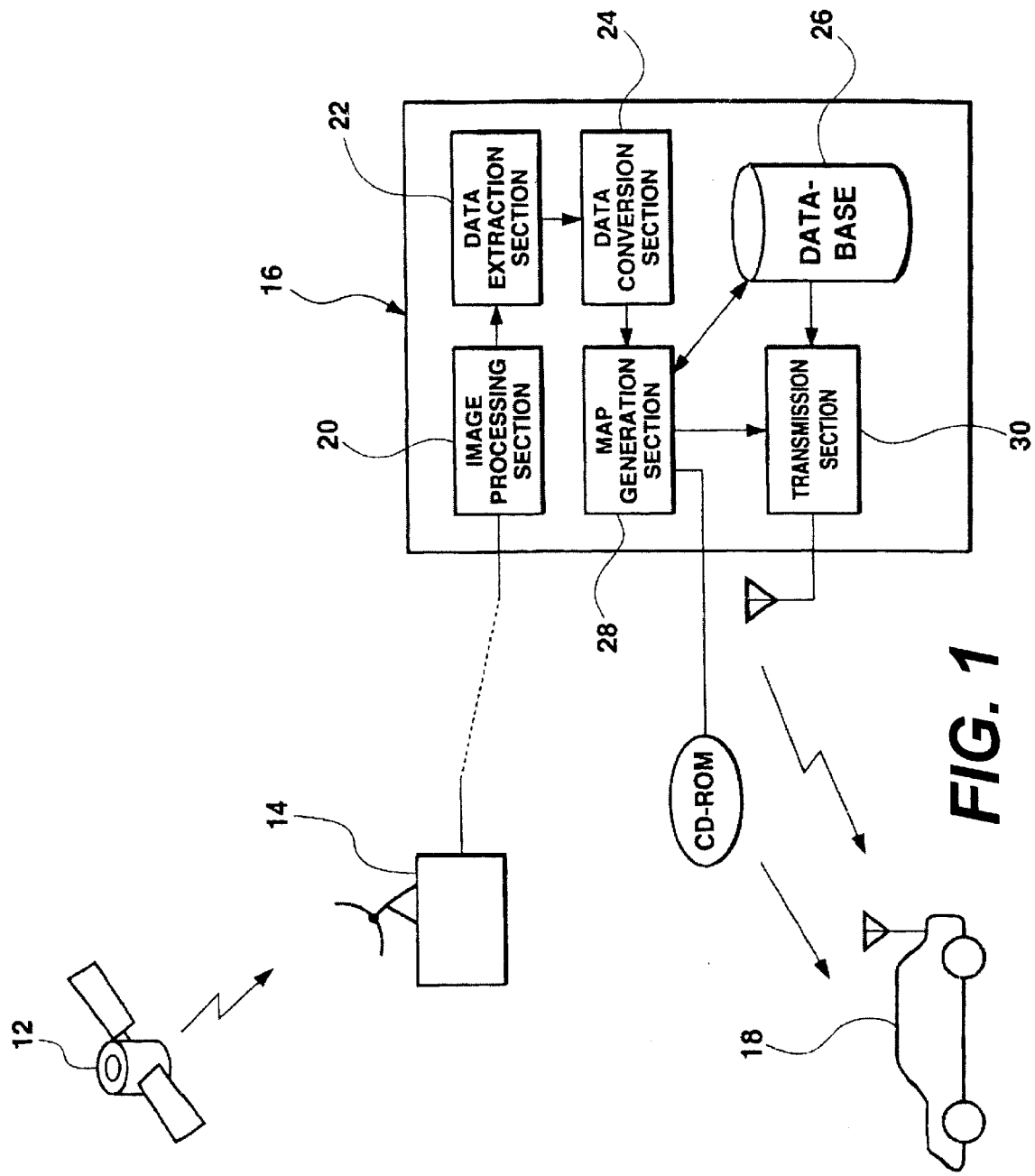
FIG. 1 is a conceptual diagram illustrating a general structure of a digital map data processor according to an embodiment of the present invention.

FIG. 1 is a conceptual diagram illustrating a general structure of the digital map data processing device, hereinafter simply called the processor, of this embodiment. The processor mainly comprises a map image processing station 16 which acquires satellite image data of the ground surface through a satellite communication station 14 as image data acquiring means for sequentially receiving the image data sent from imaging means, which captures an image of the ground surface while flying above the ground surface at a predetermined altitude, such as a satellite 12 or the like which is orbiting the earth. Map data generated by the map image processing station 16 is delivered to a vehicle 18 of a user using the map or processing equipment (such as a computer) having various types of map-using applications (such as a retrieval system) through wired or wireless communication means or any storage medium such as CD-ROM or DVD.

The map image processing station 16 includes an image processing section (image processing means) 20 which performs orthoimage processing on a satellite image obtained through the satellite communication station 14, a data extraction section (data extraction means) 22 which extracts desired road network data from the converted orthoimage, e.g., three-dimensional information of the shape of roads and the facilities and terrain related to the roads, and a data conversion section (data conversion means) 24 which converts the extracted road network data into a data format corresponding to a predetermined digital road map. The data conversion section 24 converts the road network data to have basic information (e.g., link information) to relate the road network data with an existing digital road map. The map image processing station 16 also has a map generating section (map generating means) 28 which superimposes attribute data and the like obtained from a map database 26 which has existing map data (e.g., place names, road names, intersection names, various traffic restriction information, information about building along roads and the like) on the converted road network data to generate digital orthomap data and a transmitting section (transfer means) 30 which transmits the generated digital orthomap data to the user, namely the vehicle 18.

The orthoimage processing is processing which performs image processing of satellite images (image data of the ground surface) of one and the same area taken from a plurality of angles to convert the ground surface into a state viewed substantially from directly above. When a photo of a large area is taken, the periphery of the photographed area having a small photographing angle indicates a slantly viewed state, so that the roads, buildings, terrain and the like on the ground surface are deformed. But, the orthoimage processing enables the entire photographed area to have a state photographed from directly above, so that the roads, buildings, terrain and the like on the ground surface are not deformed and have the same forms as the actual ones. The state viewed substantially from directly above does not necessarily mean complete perpendicularity to the ground surface but simply means a level that the roads and buildings on the ground surface are given in a planar view.

Figure 2:
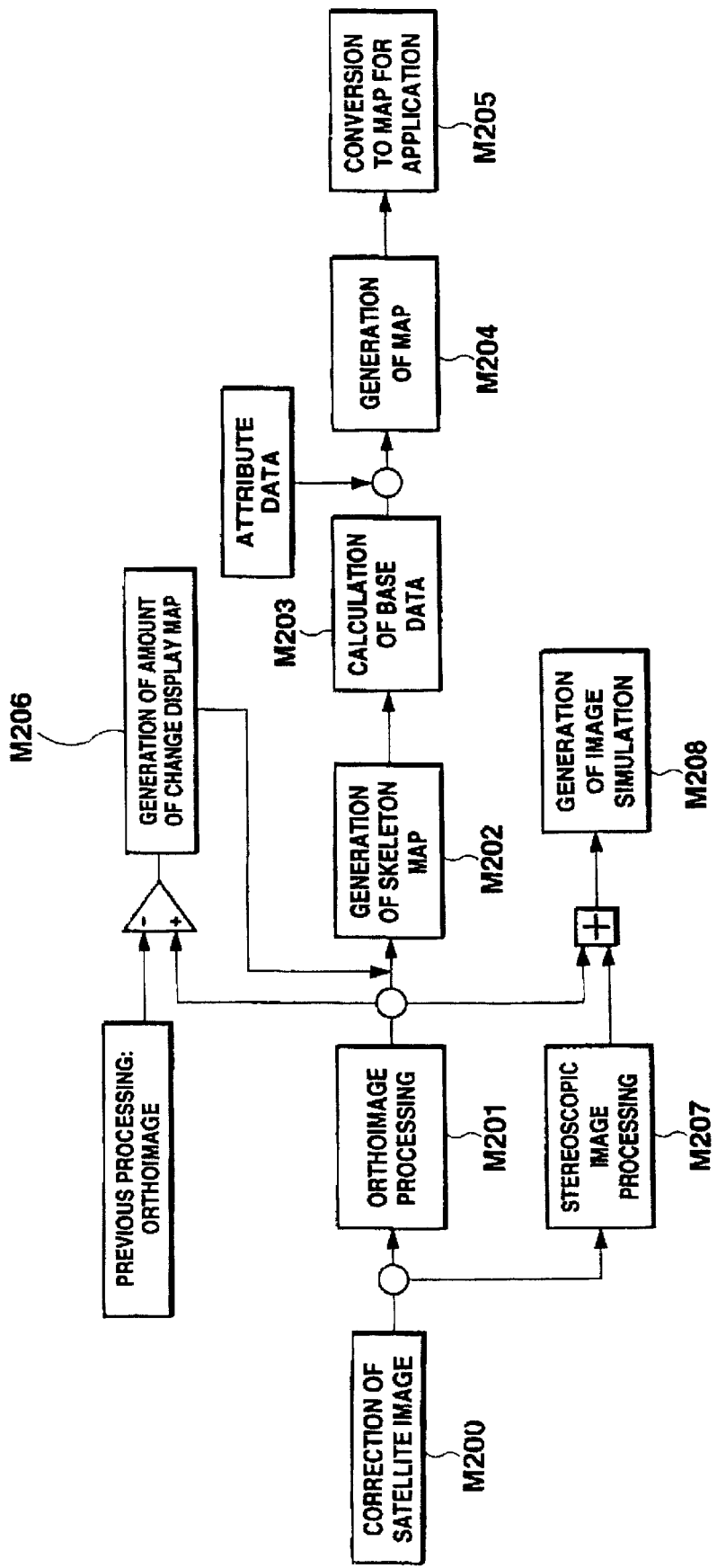
FIG. 2 is a schematic diagram showing a concept of generating digital orthomap data by the digital map data processor according to the embodiment of the present invention.
Figure 3:
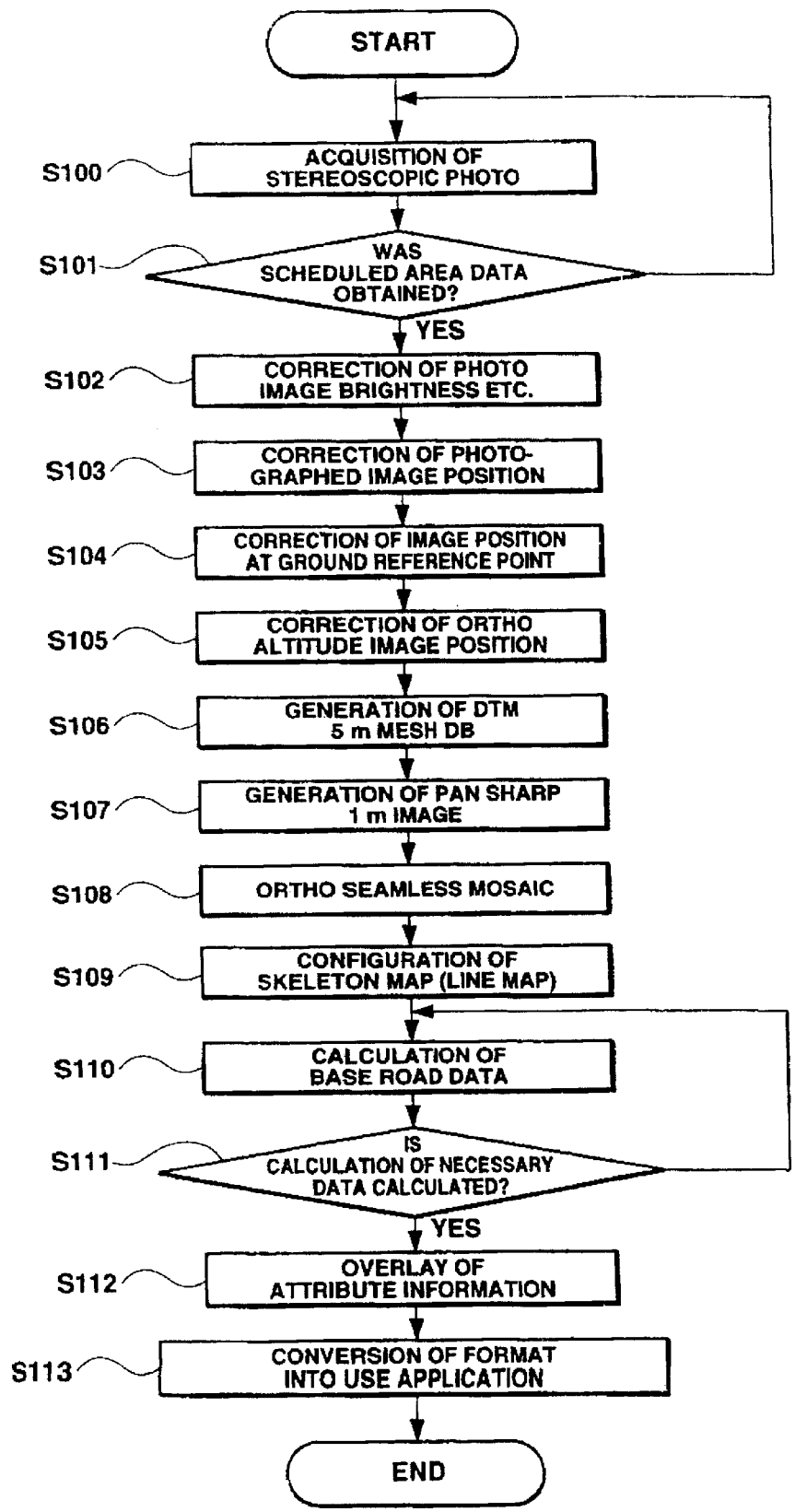
FIG. 3 is a flowchart illustrating a procedure of generating the digital orthomap data by the digital map data processor according to the embodiment of the present invention.

A procedure of generating the digital orthomap data within the map image processing station 16 will be described with reference to the schematic diagram of FIG. 2 and the flowchart of FIG. 3 in addition to FIG. 1. First, the image processing section 20 of the map image processing station 16 obtains a satellite image of a subject area acquired by the satellite communication station 14 by communication means (wireless or wired) (S100). The satellite image data obtained here includes a plurality of images of one area captured from a plurality of angles as described above. Generally, the artificial satellite orbiting the earth passes the same orbit cyclically. To take photos of the same place from a plurality of angles (e.g., ±27 degrees with respect to a perpendicular line to the ground surface), the image processing section 20 can produce so-called stereoscopic photographs of the same point taken from at least two directions. And, the map image processing station 16 judges whether image data of a scheduled area used for generating a map has been obtained (S101) and, when the desired image data has been obtained, starts correcting each of the image data (M200). First, the obtained image data is corrected for brightness and saturation (S102). Generally, the artificial satellite passes from north to south of Japan in about three minutes and causes a shadow due to a time lag or a change in saturation depending on an angle of reflected light. Therefore, correction is effected to have brightness and color at a predetermined level so to correct to a human-friendly image.

Then, the photo image position is corrected (S103). This correction is made to correct the data possessed by the artificial satellite at the photographing time, e.g., correction of the image data effected according to the position data of the artificial satellite at the photographing time, photographing angle data, etc., and effected for correction of the position to determine an area used as data or the like in the photographed range and for associating the image data with the position and angle data. Then, matching correction is effected to match ground reference points with reference points on the image data (S104). The ground reference points are determined at given positions (places having specific latitude and longitude) on the earth. For example, when all of Japan is decided to be an area shown on a map, the aforesaid reference points are determined at respective points in a total of about 200. By virtue of the corrections effected in the aforesaid (S103) and (S104), the map image processing station 16 can recognize the image data arbitrary taken by the artificial satellite as a series of continuous data.

The image data (stereoscopic photograph) is then subjected to orthoimage processing to convert the image data into a state that the ground surface is imaged from directly above. Since the orthoimage processing is performed with a stereoscopic image used as basic data, altitude information of the respective points can be obtained by triangulation techniques or the like. As a result, the image data is converted into a plan-viewed state, and the roads, buildings, and terrain at a given position on the image data are shown without being distorted. Further, altitude information is given for the respective points so that the roads, buildings, and terrain at a specified point on the image data become stereoscopic data (S105).

DTM (digital topology model) data base having the image data with latitude, longitude, and altitude associated with numerical value data is generated (S106). The DTM database is a matrix data base which has a mesh of 5-m intervals on the image data and the respective points of intersection associated with the latitude, longitude, and altitude data of the image data. In addition, a pan sharp 1-m image is generated (S107). Generally, satellite images are taken at various frequencies. For example, a monochrome near-infrared film having a resolution of 1 m or a color film having a resolution of 4 m is used. Accordingly, a color photo having a resolution of 1 m is composed by combining the advantages of such films. Comparison of two DTM data after the expiration of a predetermined time in a comparison section to be described afterward enables to recognize a change in height of buildings and altitude of terrain. Similarly, it is possible to recognize new construction, repair, removal, etc. of roads and buildings by comparing two pan sharp 1-m images after the expiration of a predetermined time, and a finally generated digital orthomap can be updated automatically by automatically recognizing an amount of change. A database based on the above orthoimage has horizontal precision of 1 m and vertical precision of 1.5 m. Therefore, a size on the image, e.g., a road width or the like, can be recognized by analyzing the converted orthoimage and can be used to decide a thickness of each structure line in generating a skeleton map to be described afterward.

Data up to this point is belt-shaped data having a predetermined photographed width generated according to the satellite image. Respective belt-shaped ortho-treated data are then connected to generate an ortho seamless mosaic (S108). At this time, each belt-shaped ortho-treated data has 5-m interval mesh data (latitude, longitude and altitude) to thereby obtain orthoimage data of a desired seamless area (M201).

The first half of the image processing based on the satellite image is completed as described above. Then, the data extraction section 22 extracts road network data on the basis of the generated orthoimage data. Specifically, a skeleton map is generated (S109, M202). To generate the skeleton map, data of an existing map is taken into the orthoimage data, and roads on the orthoimage data and stereoscopic information (road network data) about the roads are extracted. The road network data includes, for example, terrain, facility externals, and other data in addition to the road data. At this point, continuity of image elements on the orthoimage data is recognized in connection with the roads, and newly constructed, modified or changed roads not included in the data of the existing map are taken into consideration to configure the skeleton map. In other words, even if the referenced existing map data is low in precision, the orthoimage data which has accurately recognized actual roads and road-related information can be taken in to quickly extract the road network data.

The generated skeleton map includes latitude, longitude, and altitude data, so that the data conversion section 24 performs division of the links of roads based on the forms of roads recognized in generating the skeleton map and calculates base road data for each link of roads (S110, M203). The base road data may include, for example, link information (a link-to-link distance, an inclination, a radius of curvature of a curve, etc.), road structures, and the like. Already obtained road width, altitude, and the like are also held as the base road data. Navigation, to be described later, can be performed smoothly according to the base road data. The link information can be calculated on the basis of DTM 5-m mesh data. Therefore, a link-to-link distance, an inclination, a radius of curvature of a curve can be substantially the same as the actual forms, and a real image can be composed when image simulation, to be described afterward, is performed.

Figure 4:
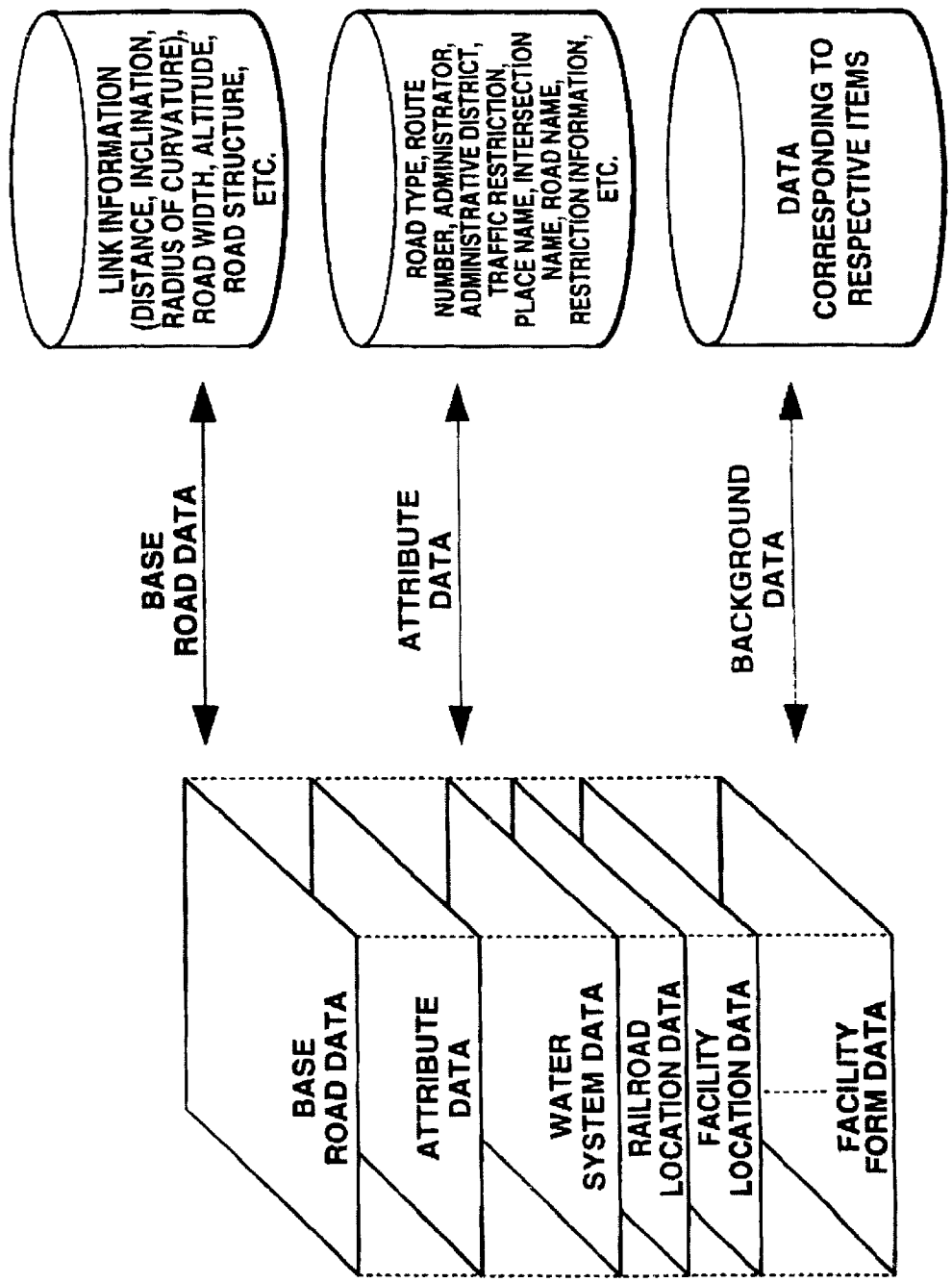
FIG. 4 is an explanatory diagram illustrating a structure of the digital orthomap data by the digital map data processor according to the embodiment of the present invention.

It is then judged whether or not the base road data was acquired (S111). When it is judged that the data has been acquired, the map generation section 28 refers to the known database 26 to overlay the attribute data on the skeleton map so to generate a digital orthomap (S112, M204). The attribute data is information obtained from the known database which can be updated as required, and includes road types (such as an expressway, an ordinary road, a tollway, a national road, a prefectural road, a municipal road and a private road), a route number, a road administrator type (national administration, prefectural administration, etc.), an administrative district type, traffic control (a speed limit, one-way traffic, a no-parking area, etc.), a place name, an intersection name, a popular road name, various guides, and other data. If necessary, a stereoscopic figure related to a road, especially background data, may be overlaid. The background data includes, for example, river system data (rivers, lakes, ponds, etc.), railway position data (route locations, station locations, etc.), facility location data, facility form data and the like. By overlaying the background data as described above, a map much closer to actual scenery and environments can be generated. The attribute data is hierarchized for each type, so that it is desirable to overlay only necessary information by converting a format so to correspond with an application to be used (S113, M205). For example, the data may have information about roads only with other facility information and the like omitted, or facility information added to road information related to the outskirts of the main cities only (e.g., a radius of 10 Km) and other areas limited to indicate road information only. FIG. 4 shows a data structure containing the base road data, attribute data and background data. Thus, the digital orthomap is subjected to the format conversion depending on the use application to enable the efficient treatment of the application.

The digital orthomap whose format was converted is delivered to the vehicle 18 through the transmitting section 30 or recorded on a storage medium such as CD-ROM and delivered to the vehicle 18.

For the aforesaid digital orthomap data to be effectively used by various types of applications, it is desirable that the data be frequently (e.g., once every several months) corrected. In this case, it is inefficient to regenerate all the digital orthomap data. Therefore, it is desirable to detect a change in the data and to correct and update the changed portions only.

Figure 5:
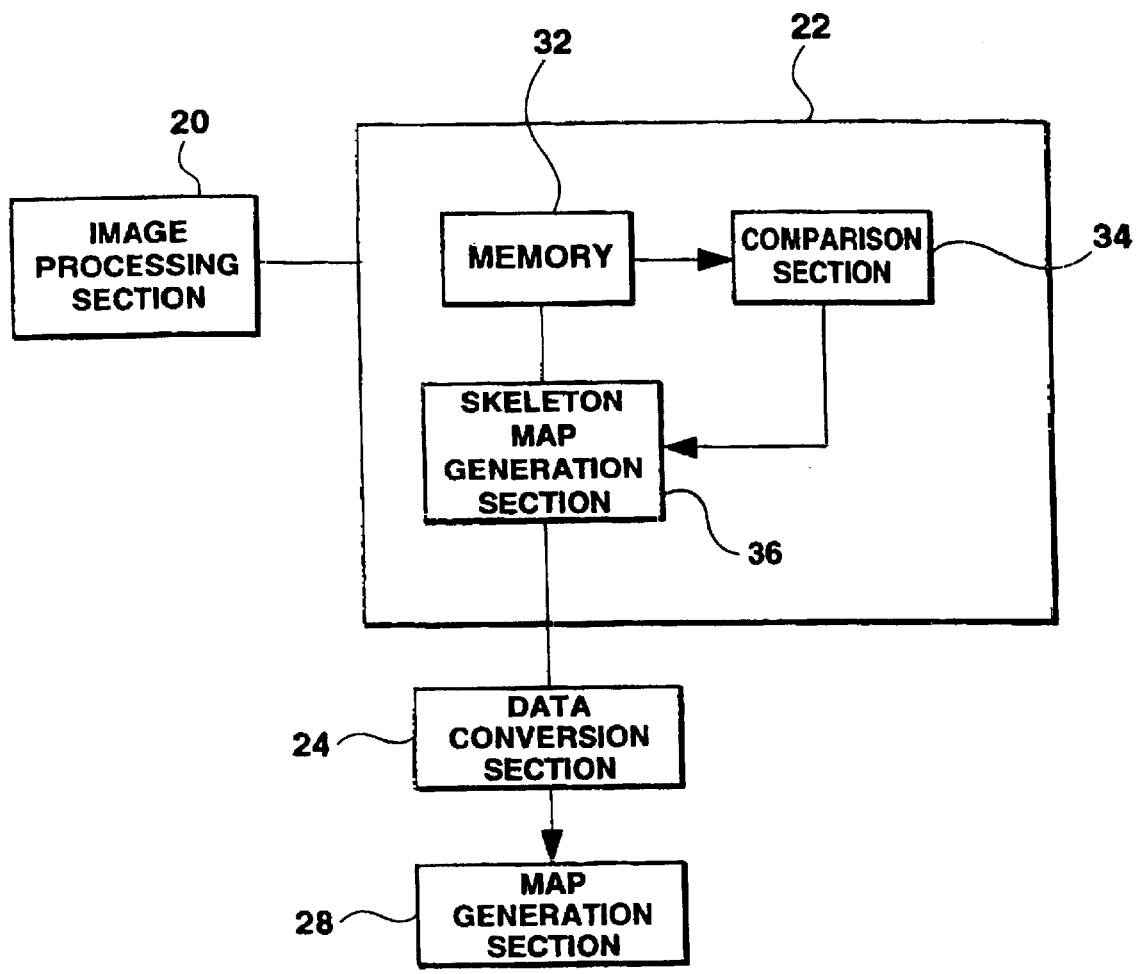
FIG. 5 is a structural block diagram illustrating a structure around a data extraction section of the digital map data processor according to the embodiment of the present invention.

FIG. 5 is a block diagram showing detection of a changed portion in data. The data extraction section 22 has therein a memory 32 for storing earlier orthoimage data together with the latest orthoimage data. The memory 32 may store the orthoimage data in a state of DTM 5-m mesh data or in a state of pan sharp 1-m image. When new orthoimage data is input to the memory 32, the new orthoimage data and the old orthoimage data which was previously stored in the memory 32 are input to the comparison section (comparison means) 34. The comparison section 34 performs the correspondence comparison and overlapping comparison of the new and old orthoimage data to obtain data of changes between the new and old data. The skeleton map generation section 36 generates a partial skeleton map related to the acquired data of the change portion (M206) and the data conversion section 24 calculates base road data about the partial skeleton map and converts into data corresponding to the digital road map to provide it to the map generation section 28. The map generation section 28 corrects a corresponding portion of the previously generated digital orthomap according to data generated on the basis of the changed portion data to reflect information of the latest image data. In other words, unchanged portions in the new and old orthoimage data, namely unchanged portions of the road forms, buildings and terrain changed with the lapse of time, can be omitted from processing, so that a processing burden can be reduced, and data can be updated quickly.

When the digital orthomap data is transmitted by the transmission section 30, only the digital orthomap data of the changed portions (partial data) formed according to the changed portion data is transmitted, and the digital orthomap data (general data) previously received by the receiving side (e.g., the vehicle 18) is updated. Thus, an amount of data transmitted is remarkably reduced, and a transmission cost can be reduced.

Figure 6A:
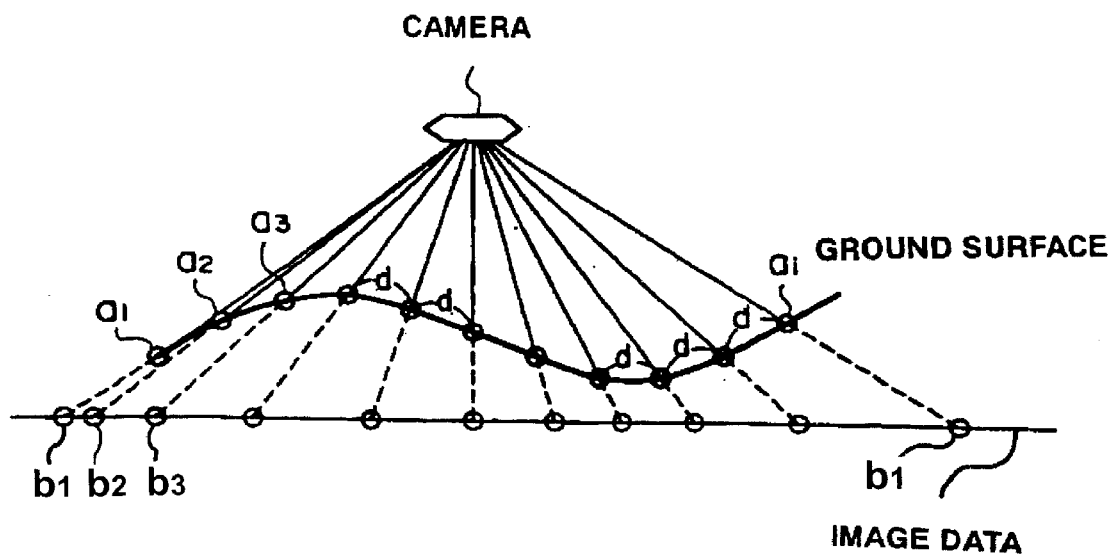
FIG. 6(a) shows image data obtained by applying conventional imaging processing to ground surface data.
Figure 6B:
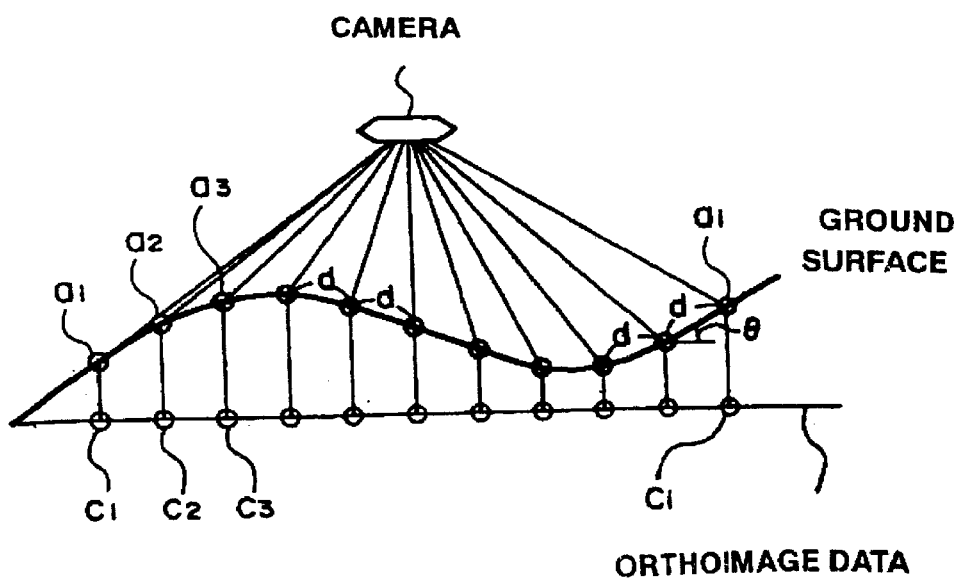
FIG. 6(b) shows orthoimage data obtained by applying orthoimage processing to ground surface data.

The digital orthomap generated as described above is on the basis of the image data viewed substantially from directly above, so that road forms and stereoscopic information (e.g., terrain, facility appearance, and the like) related to the road forms are not distorted. As a result, a distance, a road inclination, a radius of curvature of a curve, and the like of each link of roads for calculating a route can be accurately obtained. Because the road forms and the like are free from distortion, the previously generated place name data, restriction data and the like linked with the roads can be overlaid on an optimum positions. Specifically, according to a conventional method as shown in FIG. 6(*a*), when the ground surface has a difference of altitude, positions of markers a1 to ai indicated at substantially an equal interval d on the ground surface are moved on the image data owing to the positions of eyepoint (a photographing angle) of the camera, and the intervals of markers b1 to bi corresponding to the markers a1 to ai are indicated unevenly. As a result, when attribute data which is the known data is overlaid on the image data, displacement is caused, and correct indication as the map cannot be made. Especially, when there is a difference in altitude, unevenness of the intervals among the markers b1 to bi is emphasized. And, sophisticated route calculation (e.g., toll road priority retrieval, cost priority retrieval, etc.) which is an important function of the navigation, route guidance (avoidance of traffic congestion, avoidance of traffic restriction, etc.), control of warning (warning of a curve, warning of uphill and downhill slopes, etc.) cannot be made.

On the other hand, by performing the orthoimage processing as shown in FIG. 6(*b*), the respective markers a1 to ai are in a state viewed from substantially directly above, and markers c1 to ci are in a state keeping substantially an equal interval on the ground surface (a slight movement due to a difference in altitude on the ground surface; $d(1-\cos\theta)$) and indicated on the orthoimage data. As a result, when the attribute data which is the known data is overlaid, an accurate map display can be made without a displacement and the aforesaid navigation function can be performed very accurately.

Figure 7:
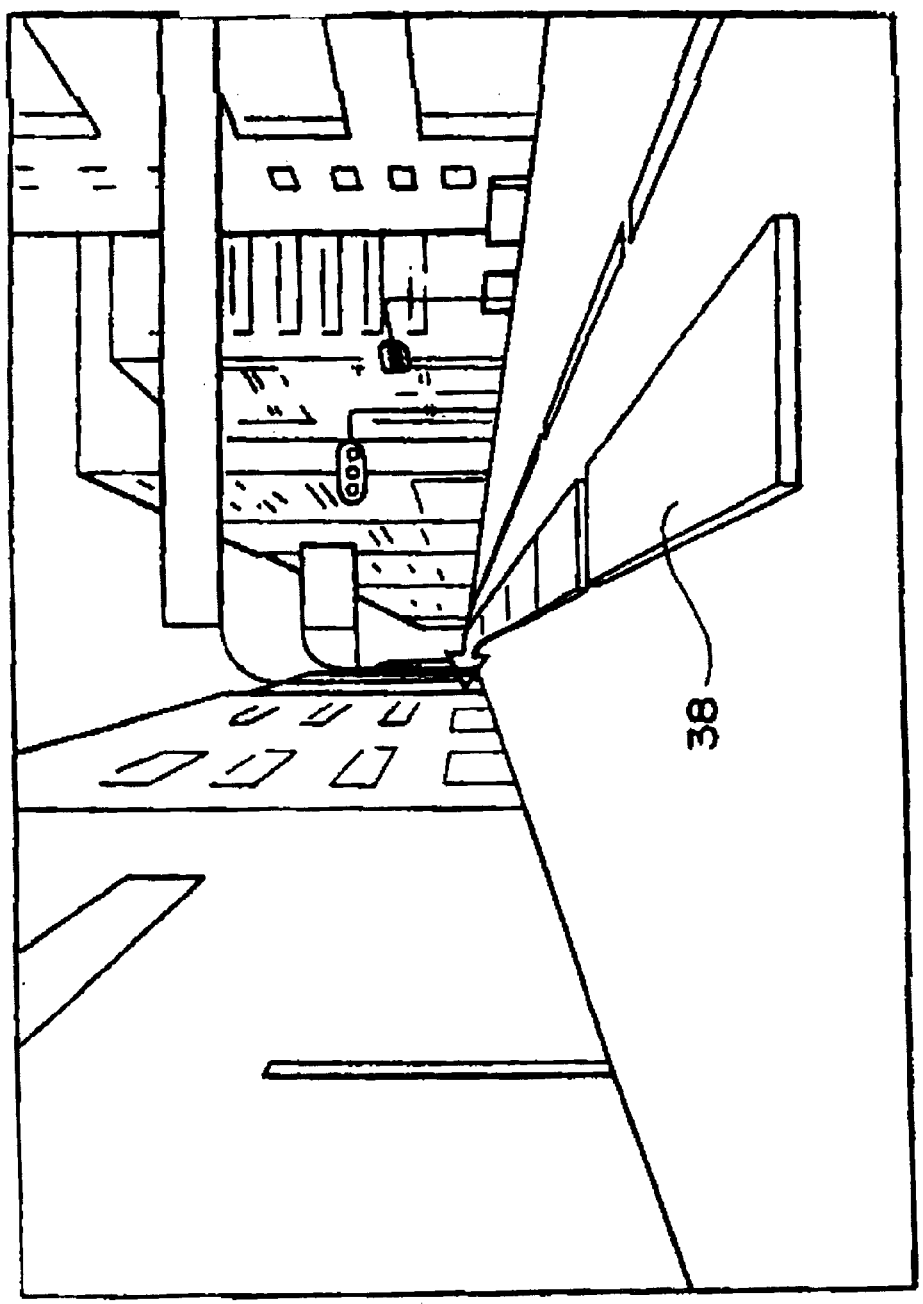
FIG. 7 is an explanatory diagram showing an example of a simulation image based on the digital orthomap data according to the embodiment of the present invention.

By using an orthoimage free from a distortion in the image, image simulation of a desired location can be performed. The orthoimage has latitude data, longitude data, and altitude data of respective positions, so that a size, height and the like of buildings on the ground surface can also be recognized. By superimposing such data on a stereoscopic photograph obtained by a satellite, a simulation image which is viewed from the same position of the eyepoint as the vehicle driver can be synthesized as shown in FIG. 7 (M207, M208). A guidance arrow 38 can also be superimposed by combining the simulation image with a route guidance function of the navigation system to be described afterward, and good navigation display can be made. The generated image simulation is delivered in the same way as the digital orthomap data by wired or wireless communication means or by means of a desired storage medium such as CD-ROM or DVD to the user's vehicle 18 using the map or processing equipment (computer or the like) having various map-using applications.

Figure 8:
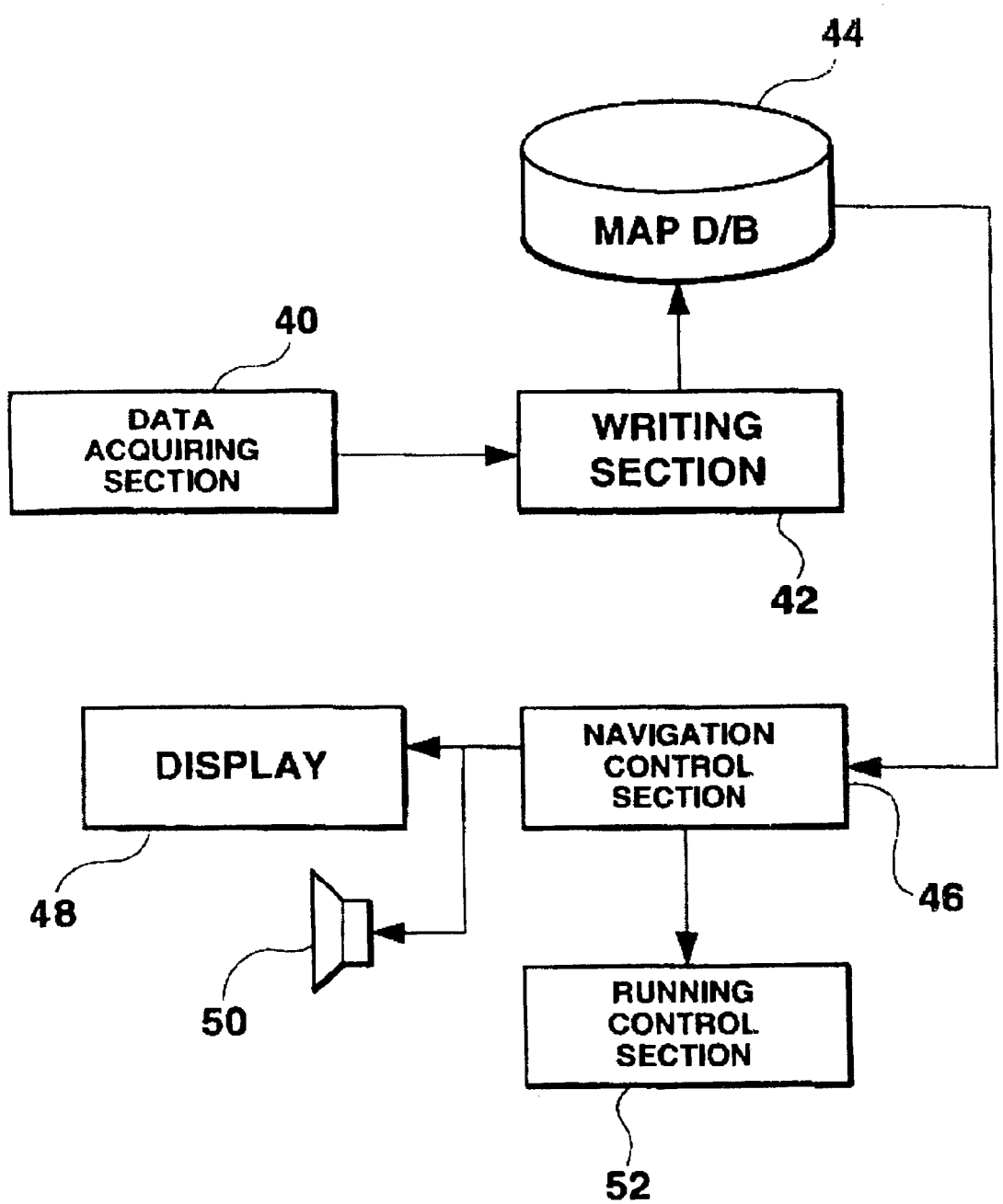
FIG. 8 is a structural block diagram illustrating a structure of the digital map data processor mounted on a vehicle according to the embodiment of the present invention.
Figure 9:
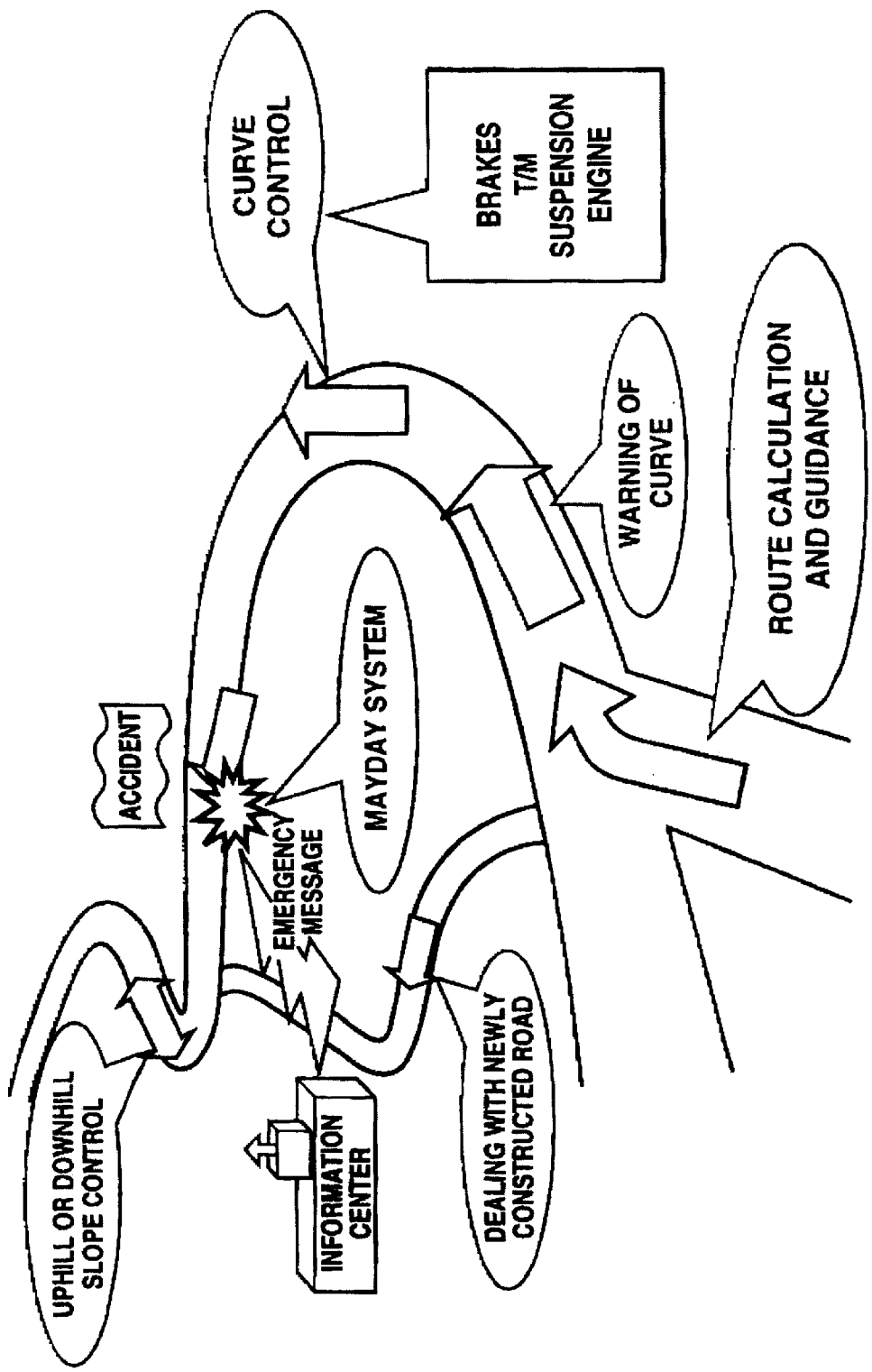
FIG. 9 is an explanatory diagram illustrating a use example of the digital orthomap data according to the embodiment of the present invention.

FIG. 8 is a structural block diagram of a navigation device having the digital map data processor mounted on a vehicle to be provided with the digital orthomap data. A data acquisition section 40 mounted on the vehicle may be a receiver which receives the digital orthomap data transmitted from the transmission section 30 of the aforesaid map image processing station 16 (see FIG. 1) or a reader which reads the digital orthomap data provided in the form of CD-ROM or DVD. The digital orthomap data acquired by the data acquisition section (data acquisition means) 40 is written in a map database 44 mounted on the vehicle through a writing section (writing means) 42. A navigation control section (control means) 46 can perform sophisticated route calculation (e.g., toll road priority retrieval, cost priority retrieval, etc.), route guidance (avoidance of traffic congestion, avoidance of traffic restriction, etc.), warning control (warning of a curve, warning of uphill or downhill inclination, etc.) according to basic road data (link data and the like), attribute data, background data and the like in addition to various types of data, latitude, longitude and altitude possessed by the digital orthomap data stored in the map database 44 as shown in FIG. 9. Such navigation control is provided to the user such as a driver by visual indication with a display section 48 and voice from a speaker 50. In this case, the digital orthomap data has accurate road forms and accurate stereoscopic information about roads, so that the aforesaid various types of navigation control can be performed very accurately. Since the overlaid attribute data and background data perfectly agree with the stereoscopic information related to the road forms and roads are coincided accurately, a high-quality map and navigation information in good agreement with real roads and rows of stores and houses can be displayed.

Furthermore, the highly accurate digital orthomap data generated as described above can be obtained simultaneously by the vehicle and each information center, and the vehicle and the each information center can make more substantial communications. Specifically, the information center (e.g., a traffic information center, the police or the like) and the vehicle share the same digital orthomap data and the information center can give accurate and quick directions to the vehicle to avoid a danger or a traffic jam according to the latest accurate map data. A highly reliable Mayday system can be configured because the vehicle and the each information system share the same digital orthomap data. Specifically, in case of an accident, an emergency case or the like, an emergency vehicle can be sent there quickly because the information center and the vehicle share the same highly accurate map data, the selection of an appropriate route and the display and direction of a correct target location can be made. When the information center receives information about an accident or the like from a running vehicle, the information can be transmitted quickly and accurately because the map data shared between the vehicle and the information center is in perfect match.

The navigation control section 46 is synchronized with the warning control to provide a running control section 52 with information such as the base road data of the digital orthomap data to control the running of the vehicle at a curve, an uphill slope, a downhill slope, and the like. The running control section 52 adjusts an amount of control and control timing of brakes, transmission, suspension, engine and the like considering a radius of curvature of a curve, an inclination of a road, the number of lanes, a vehicle body width, and the like. The digital orthomap data has accurate link information (a link-to-link distance, an inclination, a radius of curvature of a curve, etc.) so that the running control section 52 can calculate accurately and make safe and optimum timing control. The running control section 52 obtains other information (e.g., a traffic condition around the pertinent vehicle, surrounding environments, etc.) in addition to the digital orthomap data so that steering angle control and driving wheel control can be performed, and automatic driving control can also be performed.

Figure 10:
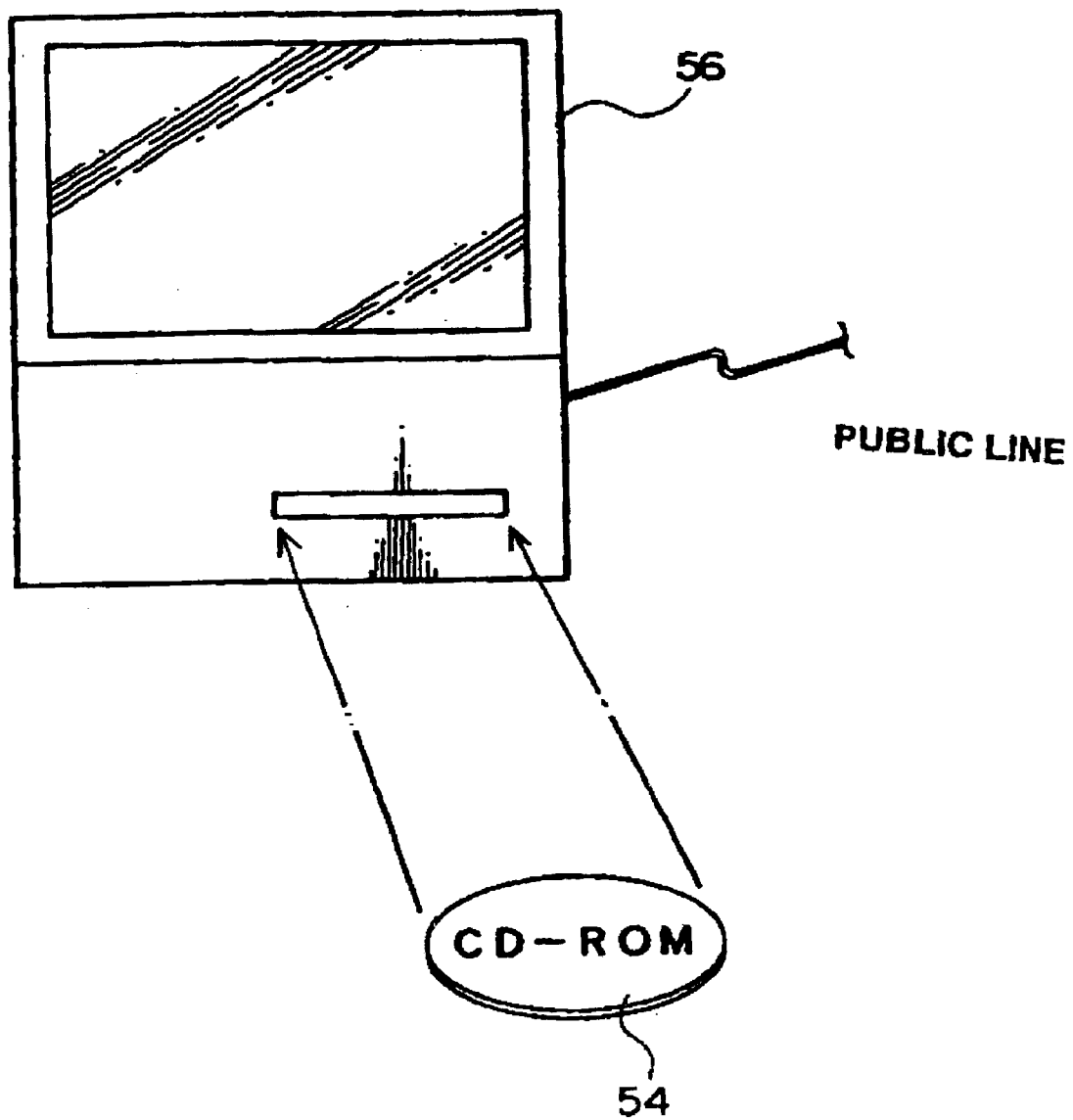
FIG. 10 is an explanatory diagram illustrating a use example of software for generating digital orthomap data according to the embodiment of the present invention.

As shown in FIG. 10, software (software for processing the flowchart of FIG. 3) for generating the digital orthomap data can be stored in a medium 54 such as CD-ROM or DVD, and executed by a processing device such as a computer 56 of the user without through the map image processing station 16 (see FIG. 1) to generate the aforesaid digital orthomap data. In this case, the image data is obtained from the satellite communication station 14 through a public line or the like. The software includes at least a module which processes to convert the image data of the ground surface photographed from a place high above and obtained through the public line or the like into the orthoimage data viewed substantially from directly above, a module which extracts road network data of the ground surface according to the orthoimage data, a data conversion module which converts the road network data into a data format corresponding to a predetermined digital road map, and a module which generates digital orthomap data by overlaying the converted road network data on the predetermined digital road map. This software can generate the digital orthomap data with a desired timing and at a desired place.

When the computer 56 is a vehicle-mounted device, digital orthomap data of a necessary area can be generated immediately depending on an area where the vehicle is running and, by adding a module for performing the processing as the comparison section of FIG. 5, to the aforesaid software, the digital orthomap data can be updated readily on the basis of the change portion data. Besides, addition of a module which performs image simulation as shown in FIG. 2 facilitates the generation of the simulation image of a user's desired position or eyepoint.

While the example configuration of the present embodiment was described referring to stereoscopic image data captured by the satellite as the base data, any stereoscopic image taken from a high point of view can be processed in the same way, and the same effect can be obtained. The attribute data and the like overlaid on the skeleton map similarly are not limited to those indicated in the embodiment, and roads and data related to the roads can be overlaid as desired, and desired digital orthomap data can be generated.

According to the present invention, image data which can be obtained easily and frequently can be used to generate accurate road map data, and the generated data can be used effectively to make highly accurate navigation and vehicle control.

INDUSTRIAL APPLICABILITY

As described above, the digital map data processing device and digital map data processing method according to the present invention are useful to generate an accurate road map and can be particularly used for navigation and control of moving vehicles based on the generated road map.

What is claimed is:

1. A digital map data processing device, comprising:
   an image data acquiring unit configured to obtain image data of the ground surface captured from a high point of view;
   an image processing unit configured to convert the image data into orthoimage data viewed substantially from directly above;
   a data extraction unit configured to extract road network data of the ground surface on the basis of the orthoimage data;
   a data conversion unit configured to convert the road network data into a data format corresponding to a predetermined digital road map; and
   a map generating unit configured to generate digital orthomap data by overlaying the converted road network data on the predetermined digital road map.

2. The digital map data processing device according to claim 1, wherein:
   the data extraction unit includes a comparison unit configured to compare first orthoimage data converted at a first time with second orthoimage data converted at a second time to obtain change portion data between them, and
   the map generating unit corrects the digital orthomap data according to the change portion data.

3. The digital map data processing device according to claim 2, further comprising transfer unit configured to transfer the generated digital orthomap data to an external map data processing system.

4. The digital map data processing device according to claim 1, further comprising a transfer unit configured to transfer the generated digital orthomap data to an external map data processing system.

5. The digital map data processing device according to claim 1, wherein image data acquired by the image data acquiring unit is satellite image data captured by a satellite.

6. A digital map data processing method, comprising the steps of:
   image data acquiring which obtains image data of the ground surface captured from a high point of view;
   image processing which converts the image data into orthoimage data viewed substantially from directly above;
   data extracting which extracts road network data of the ground surface on the basis of the orthoimage data;
   data converting which converts the road network data into a date format corresponding to a predetermined digital road map; and
   map generating which generates digital orthomap data by overlaying the converted road network data on the predetermined digital road map.

7. A medium on which generation software for generating digital orthomap data is recorded, wherein the generation software is executed on a computer and includes:
   a module which processes to convert image data of the ground surface captured from a high point of view into the orthoimage data viewed substantially from directly above,
   a module which extracts road network data of the ground surface according to the orthoimage data,
   a data conversion module which converts the road network data into a data format corresponding to a predetermined digital road map, and a module which generates digital orthomap data by overlaying the converted road network data on the predetermined digital road map.

8. A digital map data processing device, comprising:

a data acquiring unit configured to obtain digital orthomap data generated according to image data of the ground surface photographed from a high point of view;

a writing unit configured to write the acquired digital orthomap data into a map storage device associated with a navigation system; and a control unit configured to control the navigation system according to the written digital orthomap data.

9. The digital map data processing device according to claim 8, wherein the control unit also configured to control a vehicle-mounted running control device.

10. A digital map data processing method, comprising:

acquiring digital orthomap data generated according to image data of the ground surface photographed from a high point of view;

writing the acquired digital orthomap data into map storage device associated with a navigation system; and controlling the navigation system according to the written digital orthomap data.

11. The digital map data processing method according to claim 10, wherein said controlling also includes controlling a vehicle-mounted running control device.

* * * * *

UNITED STATES PATENT AND TRADEMARK OFFICE
CERTIFICATE OF CORRECTION

PATENT NO.   : 6,470,265 B1
DATED        : October 22, 2002
INVENTOR(S)  : Tanaka It is certified that error appears in the above-identified patent and that said Letters Patent is hereby corrected as shown below:

<u>Title page,</u>
Item [56], References Cited, FOREIGN PATENT DOCUMENTS, please add
-- JP 9-179967  7/1997 --.

Signed and Sealed this

Sixteenth Day of September, 2003

JAMES E. ROGAN
*Director of the United States Patent and Trademark Office*